INVENTOR.
MAX BAERMANN
BY
Meyer, Tilberry & Body
ATTORNEYS

United States Patent Office 3,500,090
Patented Mar. 10, 1970

3,500,090
STATOR UNIT FOR AN ELECTRODYNAMIC
DEVICE
Max Baermann, 506 Bensberg Wulfshof,
Bezirk, Cologne, Germany
Filed June 26, 1967, Ser. No. 648,655
Claims priority, application Germany, June 28, 1966,
B 87,752
Int. Cl. H02k 21/26, 21/38, 1/12
U.S. Cl. 310—154                                    5 Claims

ABSTRACT OF THE DISCLOSURE

A stator unit is provided for an electrodynamic device which unit includes a cylindrical, magnetic casing and an internal, cylindrical permanent magnet member having spaced, axially extending poles. The magnet member is resilient and includes a longitudinal slot so that the magnet may be deformed and then placed into the casing after which the magnet is expanded into a tight fit with the casing to provide a rigid unit.

---

The present invention pertains to the art of electrodynamic devices, such as motors and generators, and more particularly to a stator unit for such electrodynamic devices.

The invention is particularly applicable for use in producing the stator of a relatively small electric motor, and it will be described with particular reference thereto; however, it should be appreciated that the invention has much broader applications and may be used as a stator unit for various electrodynamic devices, such as generators and motors.

In the manufacture of relatively small electric motors, the stator often includes a cylindrical casing or frame including circumferentially spaced, radially inwardly facing permanent magnets defining a magnetic pole circle in which the rotor of the motor rotates. Considerable difficulty has been experienced in securing the permanent magnets to the interior of the aforementioned casing. This is partly explained by the fact that the dimensions of the various parts forming the stator unit must be relatively close to allow rapid assembly and uniform operating characteristics. In the manufacture of the stator for an electric motor, it has become somewhat common practice to provide separate, distinct sintered oxide magnets which are secured in circumferentially spaced positions around the interior of the stator casing. These magnets have been fastened into the casing by an adhesive; however, such an arrangement is relatively complex, expensive and requires complex assembly and aligning equipment. For this reason, the sintered oxide magnets commonly used in relatively small electric motors are often mechanically fastened to the interior surface of the stator casing by providing holding structures on the casing surface and sliding the individual magnets axially into these holding structures so that they grip the lateral edges of the magnet and hold them in place. This process is still relatively expensive because the casing itself must be provided with relatively expensive holding structures and the sintered oxide magnets must be modified to fit these structures. This process involves many technical difficulties since the sintered oxide magnets may be damaged during assembly. In addition, often the magnets are not accurately aligned within the casing so that the preselected diameter of the pole circle is not obtained.

To overcome this disadvantage of mounting individual relatively rigid permanent magnets to the interior surface of a stator casing, it has been suggested that arcuately shaped magnetic segments could be molded or extruded from a mixture of a permanently magnetizable material within a thermoplastic or flexible binder. Non-magnetic segments were also provided so that these non-magnetic and permanently magnetic sectors or segments could be secured in alternate fashion around the periphery of the interior surface on the stator casing. A certain amount of pretension was exerted between the magnetic and non-magnetic segments so that they were compressed into the stator casing. This arrangement presented certain difficulties since each of the segments had to be accurately machined so that the permanent magnets would tightly fit against the inner surface of the casing. If not, the casing, which formed the return path for magnetic flux lines between adjacent magnetic poles, would be spaced from the permanent magnets. This would create an internal air gap which would distract from the operating characteristics of the resulting motor.

The present invention is directed toward a stator construction which overcomes the disadvantages of prior structures by providing an easily assembled permanent magnet structure for the interior of a stator casing.

In accordance with the present invention, there is provided a stator unit for an electrodynamic machine or device which unit comprises a generally cylindrical casing formed from a high permeability material, the casing having an internal generally cylindrical surface, and a resilient permanent magnet sleeve-like element having circumferentially spaced, radially extending poles. The permanent magnet element has an outer surface generally matching the internal surface of the stator casing, a generally longitudinally extending slot defining terminal edges, and means coacting with these edges for pressing the sleeve-like element radially outwardly against the internal surface of the stator casing.

By constructing a stator unit in accordance with the invention as defined above, the disadvantages of providing separate permanent magnet segments for the interior surface of the casing are overcome. The permanent magnet sleeve is deformed, inserted into the casing, allowed to expand against the inner surface of the casing and then prestressed into this position. In this manner, the permanent magnet sleeve is tightly secured with respect to the casing without unwanted air gaps between the permanent magnet material and the casing material. Relatively wide dimensional tolerances can be compensated for by the manner in which the permanent magnet sleeve is flexed into engagement with the interior surface of the stator casing.

In accordance with another aspect of the present invention, a relatively wide slot is provided in the permanent magnet sleeve so that a spring means or other structural element can be inserted in the slot to press the permanent magnet into tight engagement with the inner surface of the stator casing. The permanent magnet sleeve is formed of a mixture of a powdered permanent magnet material preferably having a high coercive force and an elastic, possibly flexible thermoplastic binder. This type of permanent magnet is readily adapted for manufacture by injection molding, pressing or extruding. The stator casing is formed as a closed cylindrical ring constructed of a high permeability material so that the flux lines between adjacent poles on the permanent magnet sleeve can be easily conducted through the stator casing. The permanent magnet sleeve which is elastic or resilient can be easily compressed in a radial direction after being inserted into this casing. In addition, the permanent magnet sleeve may be formed into a structure having a preassembled diameter larger than the internal diameter of the casing. In this manner, when a magnetic sleeve is deformed and inserted into the casing, it then tends to seek its original shape which causes a compressive force against the internal surface of the stator casing. If need be, the surface of the permanent magnet sleeve may be provided with an adhesive for securing the magnetic sleeve within the casing. The provision of a spring means between the slot provided in the permanent magnet further assists in increasing the compressive force exerted between the magnetic sleeve and the internal surface of the stator casing.

The stator constructed in accordance with the present invention allows the production of relatively small sized electric motors at low cost because subsequent machining of the permanent magnet is not necessary. The permanent magnets can be produced quite simply in large quantities at low cost. They may be formed by extruding a straight magnetic strip which is cut into the desired axial length and rolled into a diameter which will allow axial insertion of the magnet strip into the stator casing. The permanent magnet is composed or formed of a single part which does not require complex machinery for inserting the permanent magnet into the stator casing.

The primary object of the present invention is the provision of a stator unit for an electrodynamic device or machine which unit is economical to produce and requires a limited number of components.

Another object of the present invention is the provision of a stator unit for an electrodynamic device or machine which unit includes a cylindrical casing and a single permanent magnet sleeve mounted within the casing in a manner to create a compressive force between the magnet and the casing.

These and other objects and advantages will become apparent from the following description used to illustrate the preferred embodiments of the invention as read in connection with the accompanying drawings in which.

Figure 1:
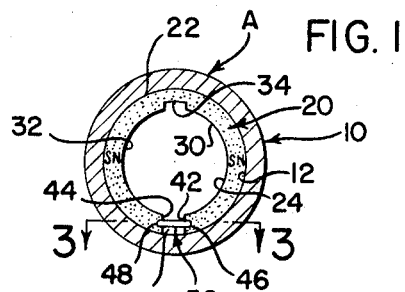
FIGURE 1 is a cross-sectional view illustrating, somewhat schematically, the preferred embodiment of the present invention.
Figure 2:
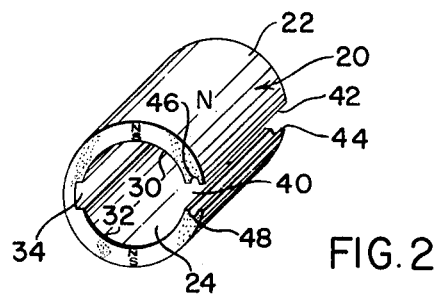
FIGURE 2 is a pictorial view illustrating, somewhat schematically, a component of the preferred embodiment of the present invention as illustrated in FIGURE 1.
Figure 3:
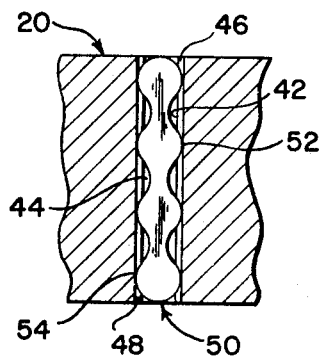
FIGURE 3 is an enlarged cross-sectional view taken generally along line 3—3 of FIGURE 1.

Referring now to the drawings wherein the showings are for the purpose of illustrating preferred embodiments of the invention only and not for the purpose of limiting same, FIGURES 1–3 show a stator unit A for use in an electrodynamic device, such as a motor or a generator. This unit includes a generally cylindrical casing 10 formed from a high permeable material and including an internal cylindrical surface 12. A flexible or resilient sleeve-like permanent magnet member 20 is provided within the casing 10. This permanent magnet member may be formed from a mixture of a permanently magnetizable powder, such as barium ferrite, and a rubber or thermoplastic binder so that the resultant member is resilient or flexible. The permanent magnet particles may be anisotropic or isotropic and these particles may be aligned by utilizing a radially directed aligning force during the formation of the member 20. When anisotropic powder is used, the aligning magnetic field is applied while the binder will allow movement of the particles. In this manner, the anisotropic particles are aligned in a radial direction within the material forming the member 20. When isotropic particles are used in the member 20, an aligning magnetic field may still be applied while the particles can be moved within the matrix or binder. In this instance, the isotropic particles form a chain-like formation to increase the magnetic values of the material during subsequent magnetization. In each instance, magnetization of the resultant solidified member 20 is done to produce the magnetic poles which will be hereinafter described in detail.

Permanent magnet member 20 includes an outer surface 22 and an inner surface 24 on which are provided circumferentially spaced magnetic poles 30, 32. These poles, in this embodiment of the invention are divided by a recess 34. It is appreciated that the permanent magnet material contemplated for use in the permanent magnet member has a coercive force of over 1,000 oersteds and a relatively low permeability. When the permeability of the magnetic particles is low, it is possible to dispense with the recess 34 without causing a deformation of the magnetic lines of force which extend inwardly of the magnet member 20. This is common knowledge within the permanent magnet field. Sleeve member 20 also includes a longitudinally extending slot 40 which defines spaced edges 42, 44 having provided respectively therein facing grooves or recesses 46, 48. As illustrated in FIGURE 1, a longitudinally extending spring 50 having transversely spaced marginal portions 52, 54 is forced into slot 40 and between edges 42, 44 so that the sleeve-like member 20 is expanded with its outer surface 22 tightly compressed against the internal surface 12 of casing 10. In this manner, the permanent magnet is tightly secured within the casing to form a rigid stator unit.

To assemble the magnet member 20 within the casing 10, the member is deformed and slipped axially into the casing. Thereafter, the normal resiliency of the member 20 allows the member to move outwardly into tight contact with the internal surface 12 of the casing. To increase the compressive force between the member 20 and the casing 10, the spring 50 is forced into grooves 46, 48. This tends to expand the member 20 into a tight engagement with the internal surface of the casing. An adhesive may be used between the permanent magnet member and the casing to further assure a tight bond between these components.

Figure 6:
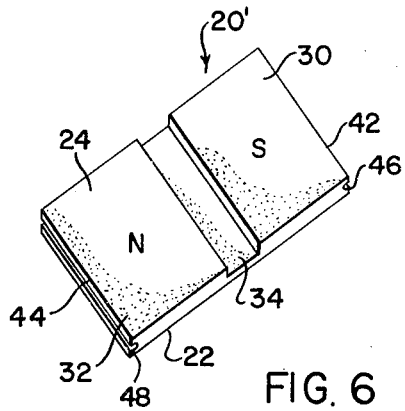
FIGURE 6 is a pictorial view illustrating an alternative procedure for producing one component of the invention as illustrated in the previous figures.

Referring now to FIGURE 6, a permanent magnet member 20' is illustrated. This member is substantially the same as permanent magnet member 20, with the exception that it is formed in a flat strip which may be extruded and cut to the necessary length. To further complete the construction of member 20', transverse recess 34 and transverse grooves 46, 48 are formed into the extruded and cut permanent magnet material. Thereafter, the permanent magnet member 20 is rolled into a cylindrical shape and forced into the casing 10. The normal resiliency of the flexible permanent magnet member 20' then causes the member to seek its undistorted shape. This forces the permanent magnet member into tight contact with the internal surface 12 of casing 10. When this has been accomplished, spring 50 is utilized for increasing the compressive forces between the member 20' and the casing 10. It is appreciated that other variations could be utilized for forming the permanent magnet member which is utilized in the casing 10 as illustrated in FIGURE 1.

Figure 4:
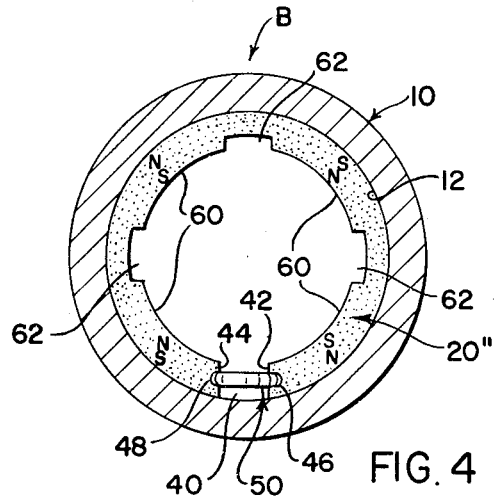
FIGURE 4 is an enlarged cross-sectional view illustrating, somewhat schematically, a further embodiment of the present invention.

Referring now to FIGURE 4, a stator unit B is illustrated. In this unit, a resilient or flexible permanent magnet member 20" includes four separate poles 60 separated by appropriate, axially extending recesses 62. In this manner, a four-pole stator unit is formed. It is appreciated that various other pole arrangements could be provided without departing from the intended spirit and scope of the present invention.

Figure 5:
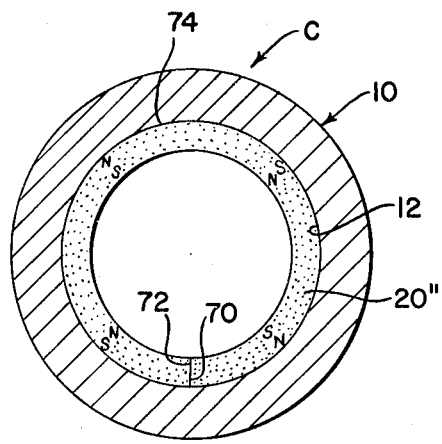
FIGURE 5 is an enlarged cross-sectional view illustrating, somewhat schematically, a further modification of the present invention.

Referring now to FIGURE 5, a further stator unit C is illustrated. In accordance with this embodiment of the invention, a resilient or flexible permanent magnet member 20''' includes edges 70, 72. These edges generally come together so that the slot between the edges is closed and no resilient spring is incorporated. The inherent resiliency of the sleeve member 20''' maintains a compressive force between the sleeve member and the casing surface 12. In this construction, an adhesive 74 physically bonds the sleeve member and the casing 10. This particular embodiment of the invention does not allow for increased compressive forces as contemplated in the previously described embodiments of the invention.

Having thus described my invention, I claim:

1. A stator unit for an electrodynamic machine, said unit comprising a generally cylindrical casing formed from a high permeable material, said casing having an internal generally cylindrical surface, and a one piece resilient permanent magnet sleeve-like element having circumferentially spaced, radially extending poles, said element formed from a mixture of permanently magnetic particles of low permeability embedded within and bonded by a non-magnetic flexible binder and having an outer surface generally matching the internal surface of said casing, a generally longitudinally extending slot defining terminal edges, and means for pressing said sleeve-like element radially outward against said internal surface.

2. A stator unit as defined in claim 1 wherein said sleeve-like element has an internal surface with said poles on said surface and axial recesses in said internal surface and between adjacent poles.

3. A stator unit as defined in claim 1 wherein said permanently magnetizable particles have a high coercive force.

4. A stator unit as defined in claim 3 wherein said particles have a coercive force exceeding 1,000 oersteds.

5. A stator unit as defined in claim 1 wherein said particles are magnetically oriented.

References Cited

UNITED STATES PATENTS

| | | | |
|---|---|---|---|
| 2,532,700 | 12/1950 | Eurich et al. | 310—156 |
| 2,535,004 | 12/1950 | Willits | 310—258 |
| 2,959,832 | 11/1960 | Baermann | 335—303 |
| 3,213,303 | 10/1965 | Riley et al. | 310—154 |

J D MILLER, Primary Examiner

L. A. ROUSE, Assistant Examiner

U.S. Cl. X.R.

310—191, 209, 218, 254